C. E. GILLESPIE.
Automatic Gates.
No. 139,712. Patented June 10, 1873.
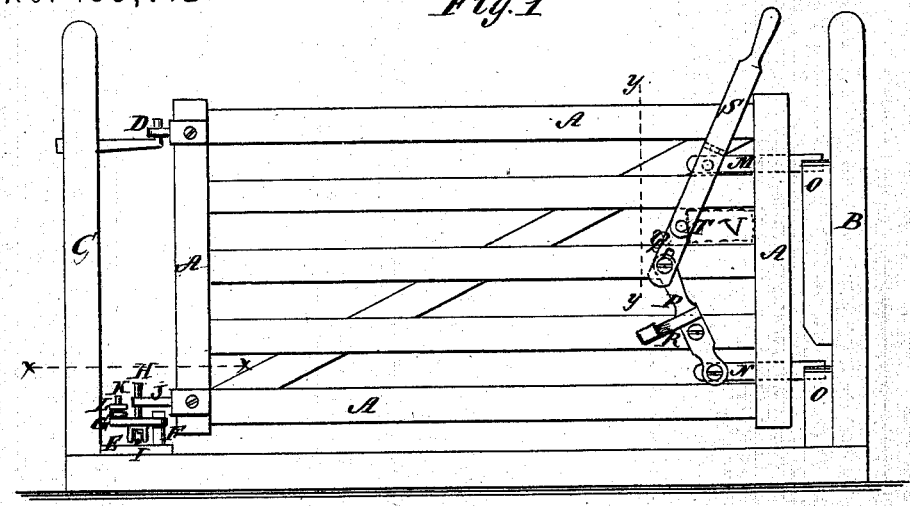
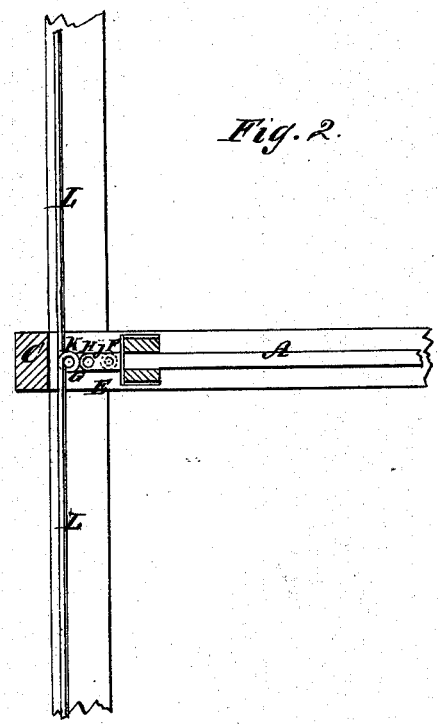
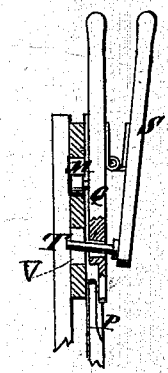
Witnesses:
E. Wolff
Sedgwick
Inventor:
C. E. Gillespie
Per Munn & Co.
Attorneys.

UNITED STATES PATENT OFFICE.

CYRUS E. GILLESPIE, OF EDWARDSVILLE, ILLINOIS.

IMPROVEMENT IN AUTOMATIC GATES.

Specification forming part of Letters Patent No. 139,712, dated June 10, 1873; application filed March 22, 1873.

*To all whom it may concern:*

Be it known that I, CYRUS E. GILLESPIE, of Edwardsville, in the county of Madison and State of Illinois, have invented a new and useful Improvement in Farm-Gate, of which the following is a specification:

Figure 1 is a side view of my improved gate. Fig. 2 is a detail horizontal section of the rear part of the gate taken through the line $x\,x$, Fig. 1. Fig. 3 is a detail vertical section of the forward part of the same, taken through the line $y\,y$, Fig 1.

Similar letters of reference indicate corresponding parts.

My invention has for its object to furnish an improved farm-gate, which shall be so constructed that it may be opened and closed by operating-levers at such a distance from the gate that the operator may be out of the way of the gate as it swings open and shut, and which shall not be liable to be unlatched and opened by stock rubbing against it.

The invention consists in the plate, stud, pivoted arm, pin, roller, and pin, in combination with the lower hinge-strap of the gate, and with the post and the operating-rods, and in the combination of the hinged lever and its pin with a stop-piece or block, the latch-levers, the latches, and the gate, as hereinafter fully described.

A is the gate, B is the front or latch post, and C is the rear or hinge post. D is the upper hinge, about the construction of which there is nothing new. To the post C, a little above the ground, is attached an inwardly-projecting plate, E, to which, near its free end, is attached a short stud, F, to the upper end of which is pivoted a short arm, G, through the middle part of which passes a pin, H, having a small wheel, I, pivoted to its lower end. The wheel I rests and rolls upon the plate E, and is beveled so that it may cut through ice that may form upon the said plate E. The upper end of the pin H receives the eye of the lower hinge-strap J, attached to the lower rear part of the gate A. To the inner end of the arm or bar G is attached a pin, K, to receive the eyes formed upon the inner ends of the rods L, which project in opposite directions along the sides of the roadway, and their outer ends are pivoted to the lower ends of levers pivoted to posts set in the ground at such a distance from the gate that the operator will be out of the way of the gate as it swings open and shut. By this construction, as the inner end of the arm G is moved in either direction by operating the rods L, the forward end of the gate A will be raised to unlatch it and the gate will be swung open in the opposite direction. The gate may be closed in the same way. The rise of the forward end of the gate A enables said gate to swing over snow, ice, mud, or other temporary obstructions. M N are two latches, which work in slots in the upper and lower parts of the forward cross-bar of the gate A, and which latch upon catches O formed upon or attached to the inner side of the front post B. The inner end of the lower latch N is pivoted to the lower end of a short lever, P, which is pivoted to the gate A, and to its upper end is pivoted the lower end of a lever, Q, which is pivoted to the gate A, and its upper end projects above the gate A so that it may be conveniently operated. To the lever P is attached a weighted arm, R, which by its weight operates to throw the latches M N forward into position to latch upon the catches O. S is a lever hinged to the lever Q, and the upper part of which projects parallel with the upper part of the lever Q. To the lower end of the lever S is attached a pin, T, which passes through a hole in the lever Q and to the rear of a stop-piece, V, attached to said gate, so that the gate cannot be opened by moving the latch-levers without first pressing the ends of the levers Q S together to withdraw the pin T.

Having thus described my invention, I claim as new and desire to secure by Letters Patent—

1. The plate E, stud F, pivoted arm G, pin H, roller I, and pin K, in combination with the strap or bolt J of the gate, and with the post C and rods L, substantially as and for the purpose described.

2. The combination of the hinged lever S, pin T, and stop-piece V, with the pivoted levers P Q, weighted arm R, latches M N, and gate A, substantially as herein shown and described, and for the purpose specified.

CYRUS E. GILLESPIE.

Witnesses:
HENRY HAMMER,
A. BOCHNING.